UNITED STATES PATENT OFFICE.

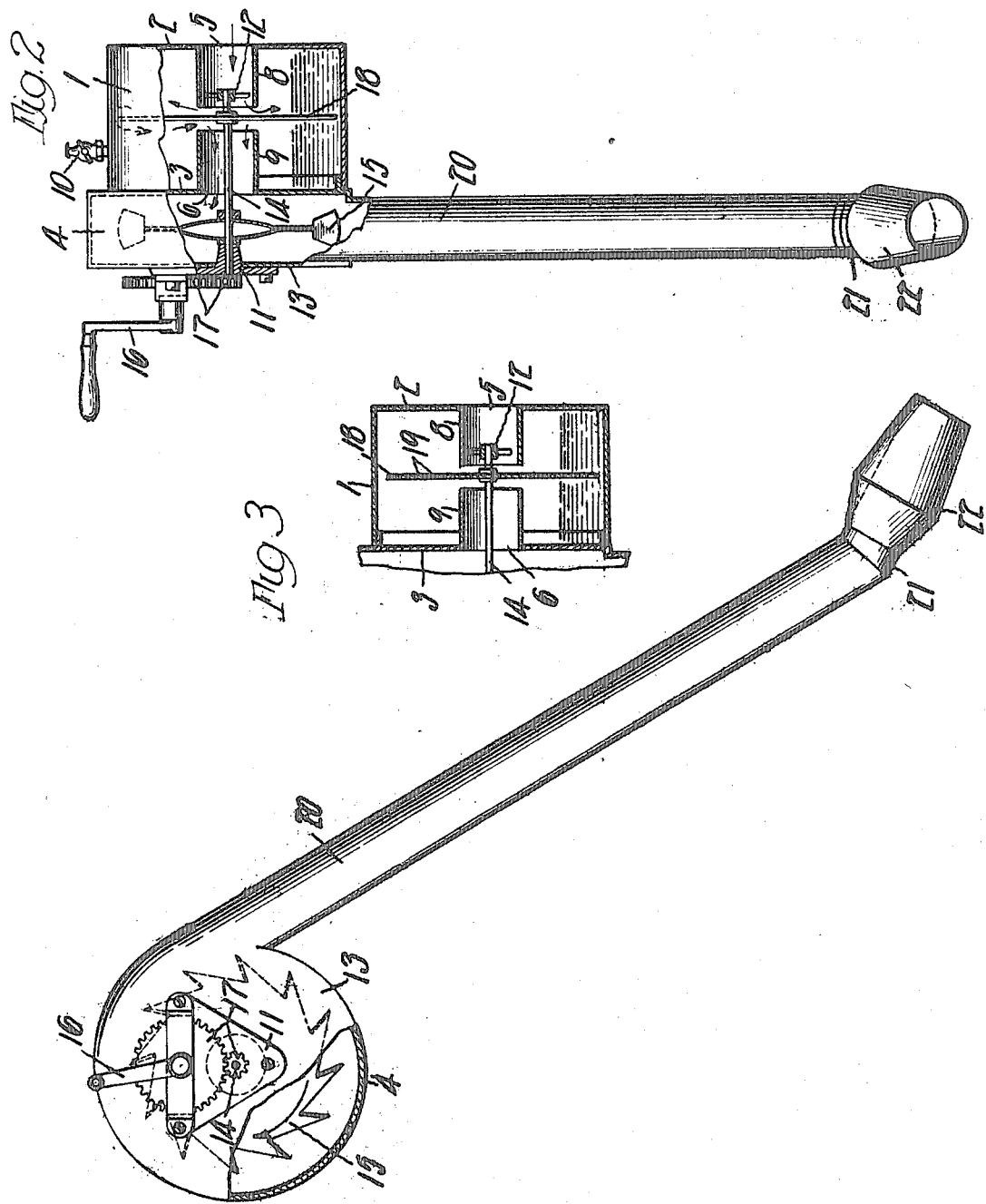

IRVING D. CHARLTON AND WILLIAM T. SHAW, OF PULLMAN, WASHINGTON.

ANIMAL-EXTERMINATOR.

1,196,208.                    Specification of Letters Patent.    Patented Aug. 29, 1916.

Application filed January 12, 1916. Serial No. 71,608.

*To all whom it may concern:*

Be it known that we, IRVING D. CHARLTON and WILLIAM T. SHAW, citizens of the United States and the Dominion of Canada, respectively, and residents of Pullman, in the county of Whitman and State of Washington, have invented a new and useful Animal-Exterminator, of which the following is a specification.

The object of the present invention is to provide a portable device whereby rodents and other burrowing animals may be exterminated; and it consists in improved means for forming suffocating or poisonous gases or vapors and for afterward delivering them to the burrow or retreat of the animal; also in a device of this nature including a liquid container freely open to the atmosphere, together with means for sucking air through the container and means for insuring intimate contact of the air current with surfaces wet by the liquid; in rotary means which dips into the liquid and insures proper saturation of the air current; also in means whereby spilling of the liquid is averted and provision is made for using the device in a wide range of positions.

The invention further consists in the details of construction shown, described and claimed.

In the drawings, Figure 1 is a side view of one embodiment of the invention, parts being broken away. Fig. 2 is a similar view at right angles to Fig. 1. Fig. 3 is a fragmentary section showing a modification.

1 indicates a liquid container, preferably cylindrical, having the outer end 2 and the inner end 3, the latter of which may also constitute one end of a fan casing 4. These ends have alined central openings 5 and 6 from which tubular passage forming members 8 and 9, that terminate a short distance apart, extend inwardly. It will be noted that the container thus formed is of annular cross section, and that when partly filled, as shown in Fig. 2, it is practically impossible to spill liquid therefrom. A cock 10 is provided to enable the container to be drained; it may be filled through the opening 5.

Mounted in the bearings 11 and 12 carried, respectively, by the wall 13 of the fan casing and one of the members 8 or 9 is a fan shaft 14 carrying the fan 15 which may be driven by means of the crank 16 and the gearing 17. The fan shaft also supports and has rigidly secured thereto between the ends of the members 8 and 9, a disk 18 that may be of metal and which dips down into the liquid; the disk may be provided with perforations 19 (Fig. 3).

Assuming the container to be supplied with liquid and the fan to be rotating as indicated by the arrow in Fig. 1, air is drawn in through the member 8 and impinges on the wet surface of the disk, from which it is deflected outwardly. It then follows the disk to the extreme outer edge or passes through the perforations 19, as the case may be, or both, and passes along the opposite side of the disk into the member 9, from which it flows to the center of the fan. From the latter it is delivered through the discharge pipe 20, which may be of metal, to the burrow or other retreat of the animal. The pipe 20 preferably has an inclined end or nozzle 21 which is provided with a tapering outer shell 22 whereby the device may be easily inserted into sealing engagement with the burrow.

It is clear that various changes may be made in the details of construction without departing from the spirit of our invention; we do not, therefore, wish to be limited otherwise than as indicated in the subjoined claims.

We claim:—

1. An animal destroyer comprising a container for a liquid having a life destroying vapor, means for establishing an air-current through the container, moving means for insuring intimate contact of the air current with the liquid throughout substantially the entire cross-section of the air current, manually operable means for moving said last mentioned means, and means for directing the vapor laden air so formed into the retreat of the animal.

2. An animal destroyer comprising a container for a liquid having a life destroying vapor, means for establishing an air-current through the container, rotary means for insuring intimate contact of the air current with the liquid throughout substantially the entire cross-section of the air current, a casing coöperating with the rotary means to form a narrow arc-shaped passage for the current, and means for directing the vapor laden air so formed into the retreat of the animal.

3. An animal destroyer comprising a container for a liquid having a life destroying vapor, means for establishing an air current through the container, a rotary disk dipping into and serving to elevate the liquid into intimate contact with the air current throughout substantially the entire cross-section of the air current, means coöperating with the disk to form a narrow passage for the current transversely of and over the disk, and means for directing the vapor laden air so formed into the retreat of the animal.

4. An animal destroyer comprising a container for a liquid having a life destroying vapor, said container being substantially circular in cross section, means for establishing an air current through the container, a rotary disk dipping into and serving to elevate the liquid into intimate contact with the air current, the edge of said disk conforming substantially to and being spaced slightly from the interior of the container whereby the air current is deflected, and means for directing the vapor laden air so formed into the retreat of the animal.

5. An animal destroyer comprising a container for a liquid having a life destroying vapor, a perforated rotary disk dipping into the liquid and serving to elevate it above its normal level in the container, means for establishing an air current through the perforations in the disk, and means for directing the air laden with vapor thus formed into the retreat of the animal.

6. An animal destroyer comprising a substantially cylindrical container for a liquid having a life destroying vapor, said container having an opening in each end, tubular members extending inwardly from the openings in the ends of the container whereby spilling of the liquid is prevented and flow of air is permitted, means for establishing an air current through the container, means independent of the tubular members interposed between the adjacent ends of the members for insuring an intimate contact of the air with the liquid whereby the air becomes laden with a life destroying vapor, and means for directing the air current into the retreat of the animal.

7. An animal destroyer comprising a substantially cylindrical container for a liquid having a life destroying vapor, said container having an opening in each end, tubular members extending inwardly from the openings in the ends of the container whereby spilling of the liquid is prevented and flow of air is permitted, means for establishing an air current through the container, and a rotary disk interposed between the adjacent ends of the members, said disk dipping into the liquid and being arranged transversely across the axis of the container for insuring an intimate contact of the air with the liquid, and means for directing the air current into the retreat of the animal.

8. An animal destroyer comprising a container for a liquid having a life destroying vapor, a passage forming member extending inwardly from one wall of the container whereby spilling is prevented, means for establishing an air current through the passage forming member, means independent of the passage forming member for directing the current into close contact with the liquid whereby it becomes impregnated with the vapor thereof, and means for afterward directing the current of vapor laden air into the retreat of the animal.

9. An animal destroyer comprising a container for a liquid having a life destroying vapor, alined passage forming members extending inwardly from opposite sides of the container, a fan casing connected to the container, a fan therein for creating an air current through the passage forming members, a fan shaft in alinement with the passage forming members, a rotary member on the fan shaft, said member being positioned between the adjacent ends of the passage forming members and dipping into the liquid to insure close contact of the air current with the liquid, and means for directing the vapor laden air current so formed into the retreat of the animal.

10. An animal destroyer comprising a container for a liquid having a life destroying vapor, said container having end forming walls normally at an angle to the horizontal, each of said walls having an opening therein above the level of the liquid, conduit forming members extending inwardly from the openings sufficient distances to allow the container to be tilted in either direction from the horizontal without spilling the liquid, means for establishing an air current through the container, and means for thereafter directing the air current into the retreat of the animal.

In testimony whereof we sign this specification.

IRVING D. CARLTON.
WILLIAM T. SHAW.

Correction in Letters Patent No. 1,196,208.

It is hereby certified that in Letters Patent No. 1,196,208, granted August 29, 1916, upon the application of Irving D. Charlton and William T. Shaw, of Pullman, Washington, for an improvement in "Animal-Exterminators," an error appears in the printed specification requiring correction as follows: Page 2, signature to specification of first-mentioned patentee, for "Irving D. Carlton" read *Irving D. Charlton;* and that the said Letters Patent should be read with this correction therein that the same may conform to the record of the case in the Patent Office.

Signed and sealed this 13th day of March, A. D., 1917.

[SEAL.]

F. W. H. CLAY,
*Acting Commissioner of Patents.*

Cl. 43—5.